US008659385B2

(12) United States Patent
Loeffler et al.

(10) Patent No.: US 8,659,385 B2
(45) Date of Patent: Feb. 25, 2014

(54) CENTER PIVOT IRRIGATION SYSTEM DIAGNOSTIC TOOL

(75) Inventors: Justin Michael Loeffler, Wallace, NE (US); Clint James Vanderwey, Crookston, NE (US)

(73) Assignee: L & V Innovations, LLC, Wallace, NE (US)

( * ) Notice: Subject to any disclaimer, the term of this patent is extended or adjusted under 35 U.S.C. 154(b) by 737 days.

(21) Appl. No.: 12/157,474

(22) Filed: Jun. 11, 2008

(65) Prior Publication Data

US 2009/0309693 A1 Dec. 17, 2009

(51) Int. Cl.
*G05B 23/02* (2006.01)

(52) U.S. Cl.
USPC ............................ 340/4.36; 340/4.1; 340/4.3

(58) Field of Classification Search
USPC ............... 340/425.5, 435, 426.1, 426.13, 1.1, 340/12.1, 12.15, 12.22, 4.31, 4.36, 5.1
See application file for complete search history.

(56) References Cited

U.S. PATENT DOCUMENTS

| | | | | | |
|---|---|---|---|---|---|
| 4,185,650 | A * | 1/1980 | Neves et al. | ............... | 137/15.01 |
| 4,899,934 | A * | 2/1990 | Krisle | ............... | 239/1 |
| 5,592,032 | A * | 1/1997 | Keizer et al. | ............... | 307/116 |
| 5,649,600 | A * | 7/1997 | Marsh | ............... | 172/4.5 |
| 5,921,280 | A * | 7/1999 | Ericksen et al. | ............... | 137/624.11 |
| 6,337,971 | B1 * | 1/2002 | Abts | ............... | 340/7.2 |
| 6,822,572 | B2 * | 11/2004 | Lentine et al. | ............... | 340/573.6 |
| 6,975,191 | B2 * | 12/2005 | Ward | ............... | 335/18 |
| 6,975,245 | B1 * | 12/2005 | Slater et al. | ............... | 340/870.16 |
| 2004/0039489 | A1 * | 2/2004 | Moore et al. | ............... | 700/284 |
| 2005/0090936 | A1 * | 4/2005 | Hitt et al. | ............... | 700/284 |
| 2006/0229108 | A1 * | 10/2006 | Cehelnik | ............... | 455/569.1 |
| 2011/0037561 | A1 * | 2/2011 | True et al. | ............... | 340/5.7 |

* cited by examiner

*Primary Examiner* — James Yang
(74) *Attorney, Agent, or Firm* — Greer, Burns & Crain, Ltd.

(57) ABSTRACT

A diagnostic tool for an agricultural field irrigation system that has a control panel including at least depressible operating switches for controlling the operation of the system includes a wireless transmitter, a wireless receiver and an actuator. The wireless transmitter is configured to selectively encode and transmit an encoded signal, and the wireless receiver is configured to receive and decode the encoded signal, and provide an output signal to activate the actuator. The actuator is operatively connected to the wireless receiver, and is configured to be removably secured to the control panel. The actuator activates at least one of the system operating switches in response to receipt of the output signal from the receiver.

6 Claims, 6 Drawing Sheets

CENTER PIVOT IRRIGATION SYSTEM DIAGNOSTIC TOOL

BACKGROUND

Center pivot irrigation is a form of overhead crop irrigation in which equipment rotates around a central pivot. Several segments of pipe are joined together and supported by trusses, mounted on mobile towers, and sprinklers are positioned along the length of the pipe. The system is fed with water from a central pivot point attached to one end of the pipe, and the entire irrigation system rotates about the central pivot point.

Each mobile tower uses wheels or tracks to move in a circular pattern. A master pace for the rotation is set by the outside wheels/tracks (i.e., the set of wheels or tracks furthest from the central pivot point), and the inner sets of wheels/tracks use angle sensors to determine when the bend at a truss/joint is exceeds a certain threshold, indicating that the tower should be moved forward to keep the pipe segments aligned. Originally, the irrigation systems were water powered, but currently most center pivot irrigation systems are powered by either electric or hydraulic motors mounted at each tower. The motor drives a reduction gearbox and transverse drive shafts transmit power to another reduction gearbox mounted behind each wheel.

Each of the center pivot irrigation systems is controlled by at least a panel control mounted on the central pivot point. Typically, the panel control allows for at least manual push-button start/stop control of the irrigation system. The control panel may also include various displays indicating, for example, electrical output, water pressure, and the like.

The center pivot irrigation systems occasionally malfunction. For example, the wheels or tracks may stop rotating. When this occurs, the process required for diagnosing and fixing the motor can be time consuming, requiring several trips through the field to repair. Typically, a worker would first need to walk to the central pivot point to shut down the malfunctioning irrigation system. Next, the worker would have to walk to the area of the span that malfunctioned to diagnose the problem. Following that, the worker probably has to retrieve any tools and repair parts required to make necessary repairs to the irrigation system. After making all required repairs, the worker returns to the central pivot to activate the system, and then must return to the area that had malfunctioned to ensure that the system is functioning properly.

Some systems allow for basic control and monitoring of the center pivot irrigation system through a mobile phone. However, in some rural farming areas, mobile phone service is unreliable or simply non-existent. Moreover, mobile phone control requires special control panels for the irrigation system. Not only are these panels more costly than a typical control panel, but separate panels must be purchased for each center pivot irrigation system the user wishes to control via a mobile phone. Additionally, there is sometimes a time delay of up to an hour or more between issuing a command to the control panel via mobile phone and execution of the command by the control panel.

SUMMARY OF THE INVENTION

An embodiment of the invention is a device which serves as a diagnostic tool for an agricultural field irrigation system that has a control panel including at least depressible operating switches for controlling the operation of the system. The diagnostic tool includes a wireless transmitter, a wireless receiver and an actuator. The wireless transmitter is configured to selectively encode and transmit an encoded signal, and the wireless receiver is configured to receive and decode the encoded signal, and provide an output signal to activate the actuator. The actuator is operatively connected to the wireless receiver, and is configured to be removably secured to the control panel. The actuator activates at least one of the system operating switches in response to receipt of the output signal from the receiver.

DETAILED DESCRIPTION OF THE PREFERRED EMBODIMENTS

Figure 1:
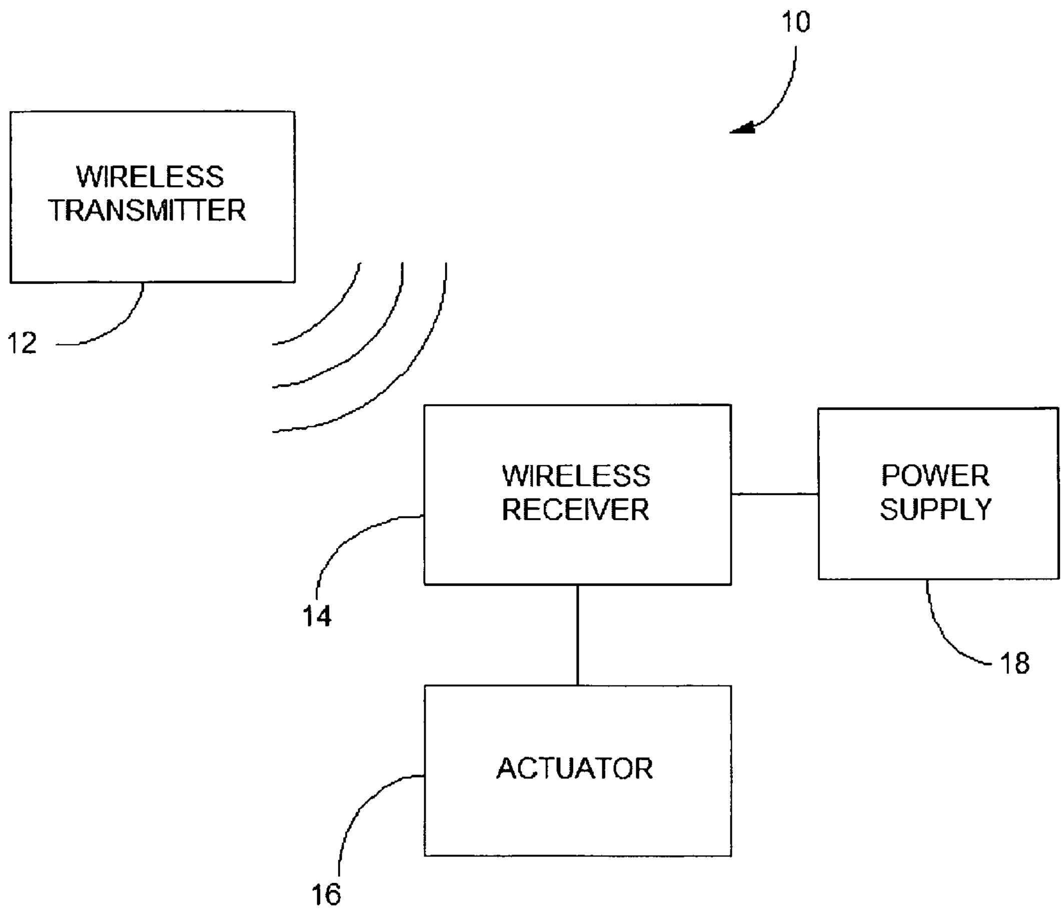
FIG. 1 is a block diagram of a center pivot irrigation system diagnostic tool according to an embodiment of the present invention.

An embodiment of the invention is a device used to start the center pivot irrigation system remotely, and that a safety switch located at one of the mobile towers can be used to stop the irrigation system, once the problem has been diagnosed. It is also contemplated that the device can be used to start and stop the center pivot irrigation system remotely, as well as control the irrigation system's direction of rotation, and cause the system to operate in a safety override mode.

A preferred embodiment of the diagnostic tool includes a wireless transmitter, a wireless receiver, and an actuator connected to the receiver. The actuator may be removably mounted on a control panel for a center pivot irrigation system, and is used to start and stop the irrigation system from a distance, reducing the traveling distance, and thus the time required of a user when diagnosing a malfunctioning center pivot irrigation system.

Preferred embodiments of the invention will now be discussed with respect to the drawings. The drawings include schematic representations, which will be understood by artisans in view of the general knowledge in the art and the description that follows. Features may be exaggerated in the drawings for emphasis, and features may not be to scale.

Referring now to FIG. 1, an embodiment of a diagnostic tool is designated generally at 10. The diagnostic tool 10 includes a wireless transmitter 12, in wireless communication with a wireless receiver 14. The wireless receiver 14 controls at least one actuator 16. The receiver 14 is also connected to a power supply 18.

Figure 2A:
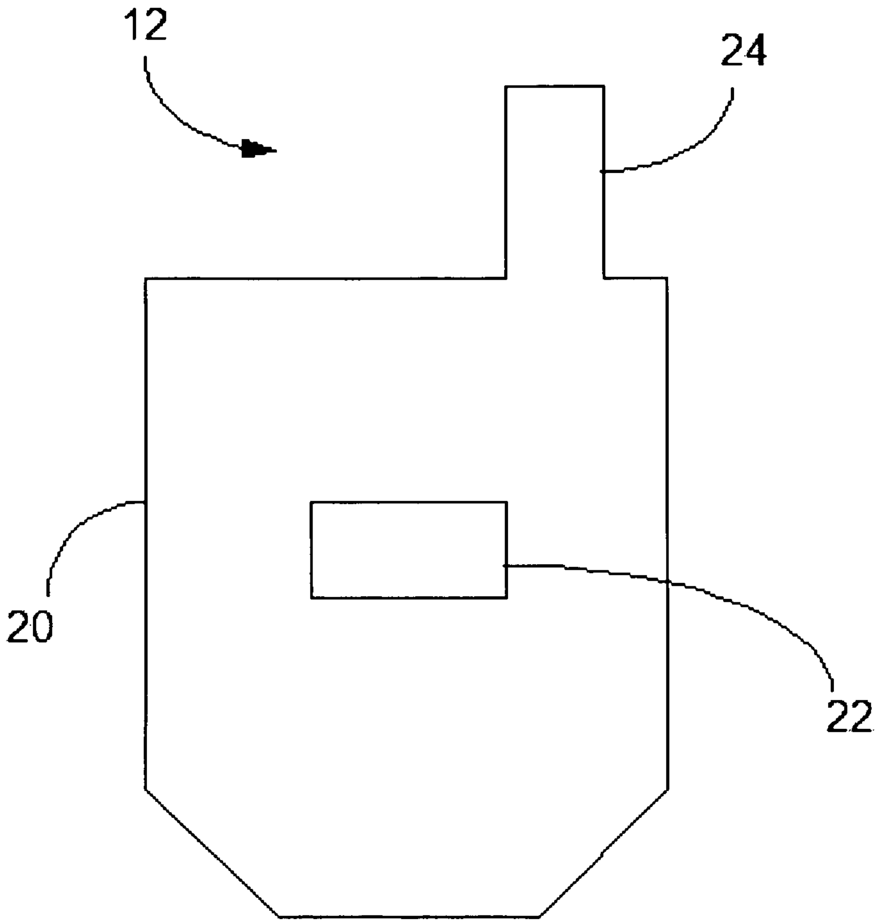
FIG. 2A is a plan view of a wireless transmitter according to an embodiment of the present invention.

FIG. 2A is a plan view of the wireless transmitter 12. The wireless transmitter 12 is covered in a case 20. The case 20 is preferably made from a hard plastic or metal, and is preferably substantially waterproof because of the irrigating environment in which it will be used. Formed on the front of the transmitter 12 is a button 22 which, when depressed, directs the transmitter to transmit a signal. It is contemplated that additional buttons 22 could be formed on the transmitter 12 to allow additional features to be controlled using the wireless transmitter. For example, an additional button 22 could be formed on the transmitter 12 to allow the transmitter to stop the irrigation system remotely. Additional buttons 22 formed on the transmitter 12 could also be used to regulate the speed and direction of rotation of the irrigation system. The transmitter 12 also includes an antenna 24, for transmitting the control signal.

Figure 2B:
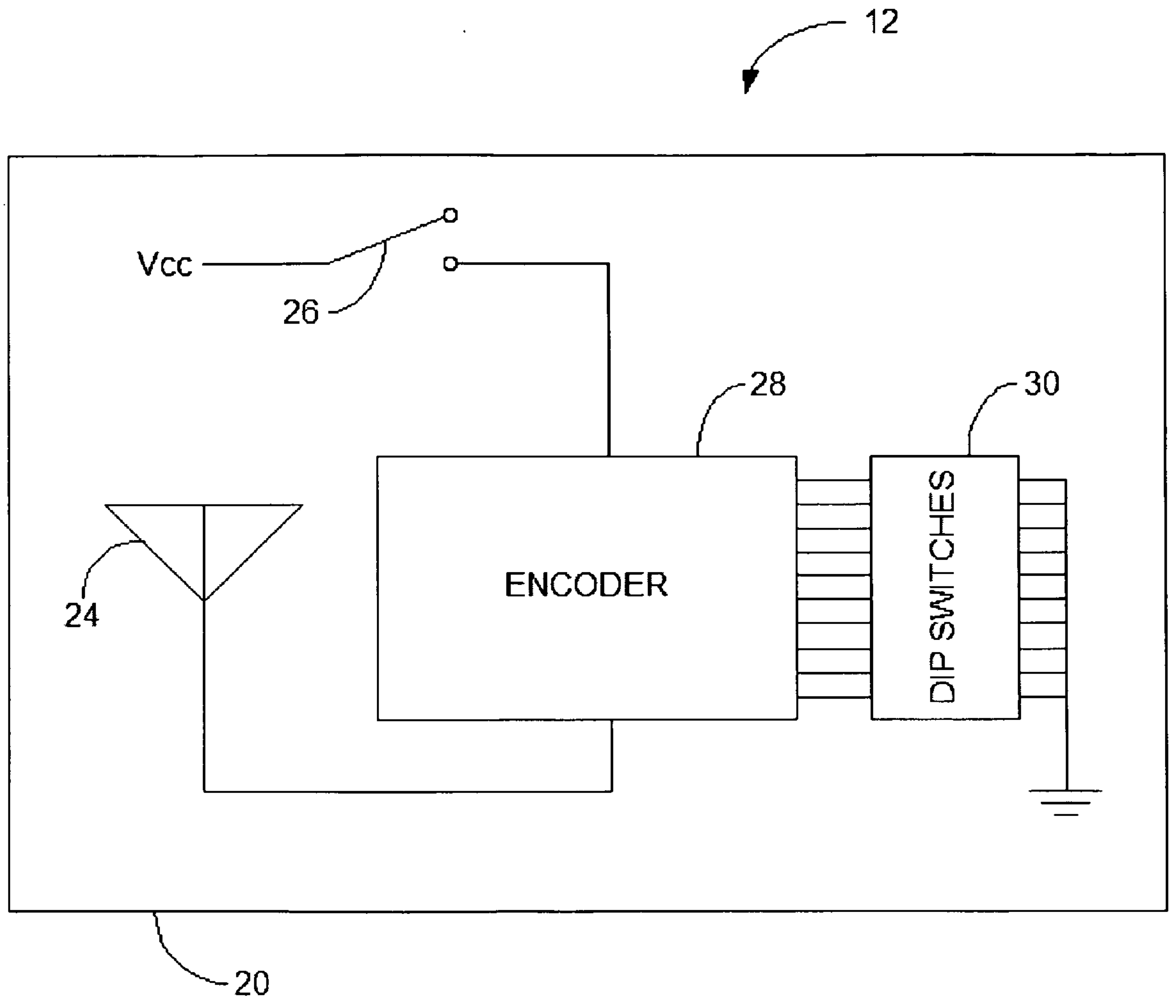
FIG. 2B is a block diagram of the wireless transmitter of FIG. 2A.

FIG. 2B is a schematic block diagram of the wireless transmitter 12. When the button 22 is depressed, a corresponding switch 26 is closed, connecting a predetermined voltage Vcc to an encoder 28. The encoder 28 also receives signals from dip switches 30. Using inputs from the switch 26 and the dip switches 30, the encoder 28 generates an encoded signal which includes at least information about the configuration of the dip switches 30 and information about the status of switch 26. The encoded signal is then output to the antenna 24, which is used to transmit the signal.

The dip switches 30 are user-modifiable, and allow a user to set an identification (ID) code. After the encoded signal has been transmitted, only a receiver using the same ID code can interpret the encoded signal. A user establishes his or her ID code by manipulating the dip switches 30 to a desired configuration. The transmitter 12 preferably has twenty four dip switches 30, allowing for more than sixteen million unique ID codes. A large number of ID codes allows for increased security, since it is more difficult for a malicious third party to identify the ID code that corresponds to a given transmitter. A larger number of ID codes also makes it possible for more diagnostic tools to operate within a small area, since a receiver will only respond to an encoded signal using a matching ID code.

The antenna 24 allows for transmission of the encoded signal. The signal is preferably transmitted at a predetermined radio frequency, although other methods of wireless transmission are contemplated. The predetermined frequency is typically selected to be within the range of about 300 MHz to about 450 MHz, although frequencies outside of this range are also contemplated. The transmitted signal has a range of approximately 1,500-2,000 ft.

Figure 3:
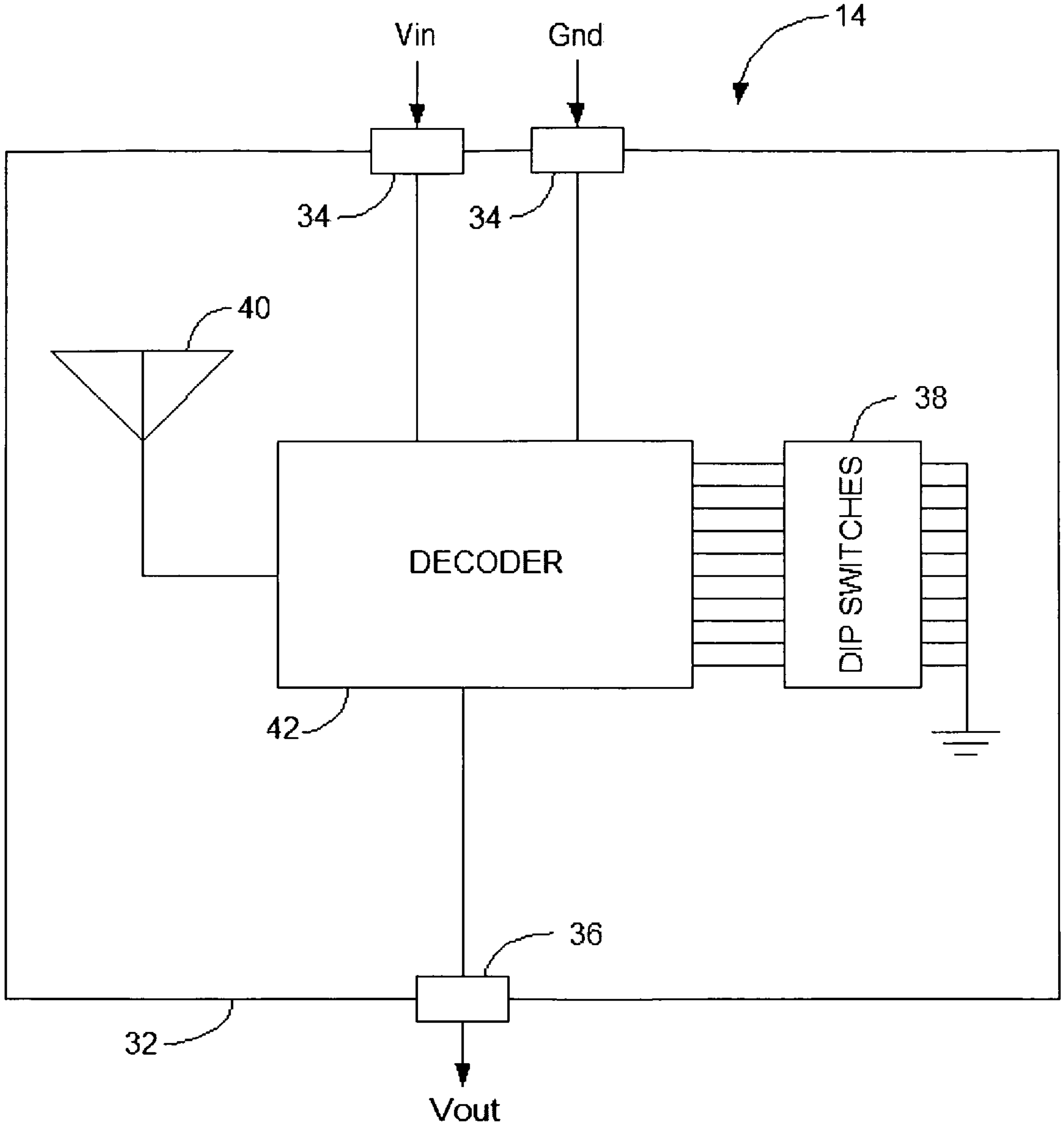
FIG. 3 is a block diagram of a wireless receiver according to an embodiment of the present invention.

FIG. 3 shows a schematic diagram of the wireless receiver 14. The wireless receiver 14 includes a housing 32 which, like the housing 20 of the wireless transmitter 12, is also preferably substantially waterproof due to the irrigation environment, and is preferably formed from a hard plastic or metal. The receiver 14 also includes at least two input terminals 34, one or more output terminals 36, and dip switches 38. Additionally, the receiver 14 includes an antenna 40 configured to receive radio frequency transmissions of the same predetermined frequency that the antenna 24 of the wireless transmitter 12 transmits at.

One of the input terminals 34 is connected to ground (Gnd), and another input terminal 34 is connected to a predetermined voltage Vin from the power supply 18. The output terminal 36 is connected to the actuator 16.

The receiver 14 further includes a decoder 42. The decoder 42 receives as inputs the ground voltage and the predetermined voltage from the input terminals 34, the signals from the dip switches 38, and the received signal from the antenna 40.

The antenna 40 is a relatively small internal or external antenna. It is also contemplated that the center pivot can act as the antenna 40. When the antenna 40 receives a transmission, the received signal is input into the decoder 42. The decoder 42 compares the received signal with the signals from the dip switches 38 to determine if the ID code from the wireless transmitter that transmitted the received signal matches the ID code specified by the dip switches 38 of the receiver 14. If the ID codes do not match, the decoder 42 does nothing further.

If the ID codes do match, the decoder 42 produces an output signal Vout that is sufficient to activate the actuator 16. The output signal is sent to the output port 36, and the output port sends the output signal to the actuator 16.

Figure 4:
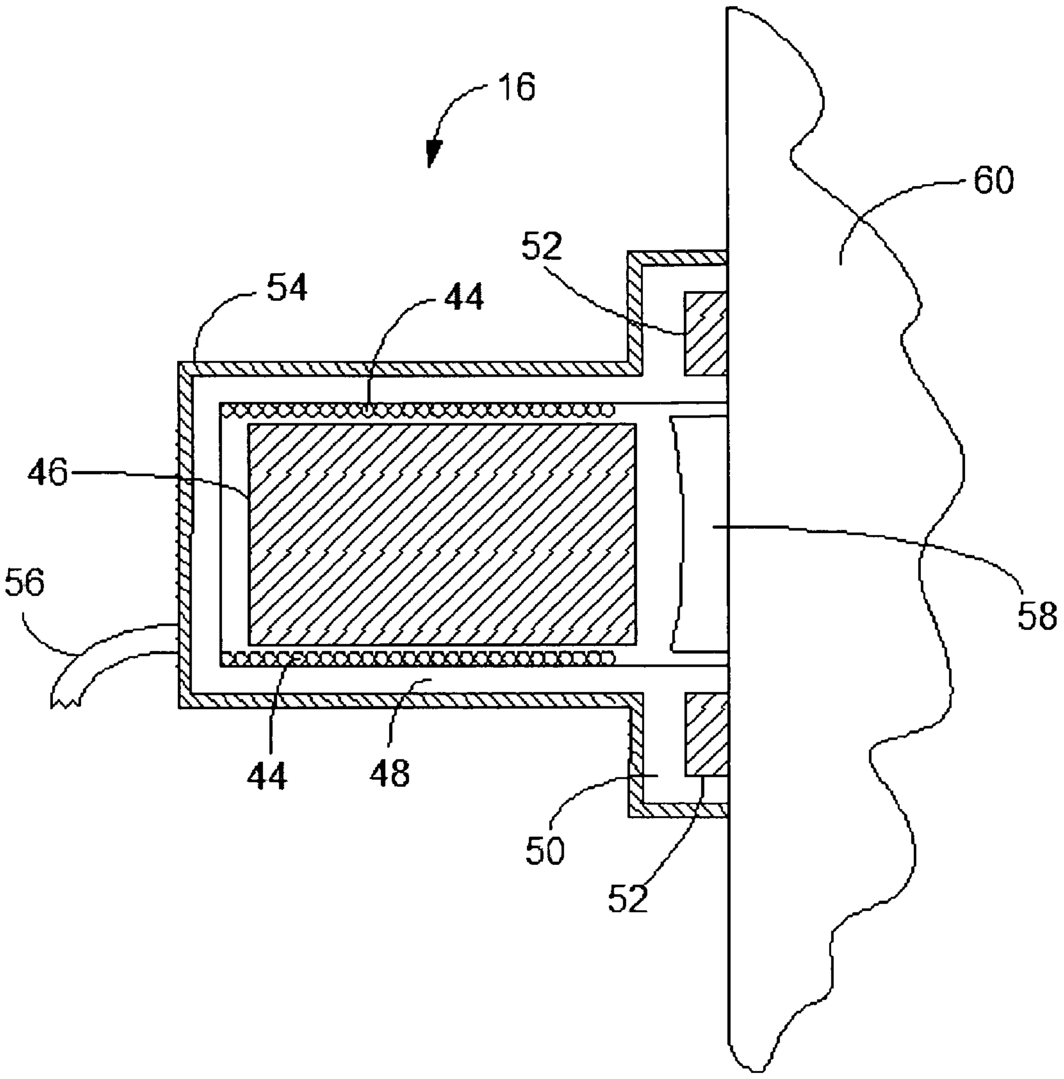
FIG. 4 is a cross-sectional view of an actuator according to an embodiment of the present invention.

Referring now to FIG. 4, a cross-section of the actuator 16 is shown. The actuator 16 preferably includes a solenoid 44 having a cylindrical ferromagnetic plunger 46. The actuator 16 further includes a housing 48, including a collar portion 50. One or more magnets 52 are embedded in the surface of the collar portion 50 of the housing 48. Finally, the housing 48 and collar portion 50 are covered by a coating layer 54. The coating layer 54 is preferably formed from soft plastic, rubber, or another material that is waterproof, rustproof, and non-conductive.

The plunger 46 preferably has a diameter that is less than the diameter of the push button on the control panel. Alternatively, it is also contemplated that the plunger 46 may include a narrowed contact portion for contacting the push button on the control panel.

The solenoid 44 includes a coil of wire surrounding the plunger 46, and the coil is connected to a wire 56 carrying the output signal from the output port 36 of the wireless receiver 14. When current is passed through the solenoid 44, a uniform magnetic field is formed within the wire coil, which causes the plunger 46 to move linearly in the direction of the magnetic field.

The throw of the ferromagnetic plunger 46 is preferably long enough to activate a start/stop push button control 58 on a control panel 60 made by any of the various manufacturers of center pivot irrigation control panels, but short enough to avoid damaging any of the push buttons. For example, the throw of the plunger 46 is approximately 19 mm (0.75 inches). Similarly, the generated magnetic field must provide the plunger 46 with a sufficient amount of force to activate the push button control 58 on the various manufacturers' control panels 60, but not so large that the plunger causes damage to the push button when activated.

The start/stop push button 58 is connected to a momentary contact switch that toggles the state of the irrigation system between operating and standby modes. Thus, if the button 58 is pressed while the irrigation system is in standby mode, the system will enter the operating mode until the button is pressed again. Similarly, if the button 58 is pressed while the irrigation system is in operating mode, the system will enter standby mode until the button is pressed again.

In operation, the actuator 16 is removably mounted onto the control panel 60 for a center pivot irrigation system. The actuator 16 is positioned such that, when the plunger 46 moves, it will strike the start/stop push button 58 mounted on the control panel 60. The actuator 16 is preferably mounted on the control panel 60 using the magnets 52 embedded in the collar portion 50. The actuator 16 is also secured using a thumb screw (not shown) mounted on the side of the actuator. It is also contemplated that the actuator 16 could be mounted via a releasable temporary adhesive that leaves no residue on the actuator or the control panel 60, suction cups, or any other method of removable mounting. The removable mounting advantageously allows a user to transfer a single diagnostic tool 10 between multiple control panels 60, if desired. The removable mounting also ensures that, should a user decide to purchase a new control panel 60, the user will not need to purchase a new diagnostic tool 10 as well.

The actuator 16 is preferably configured to have a length that is short enough so that, when mounted on the control panel 60, the actuator does not interfere with the use of a protective covering that can be placed over the control panel. For example, the actuator 16 can have an axial length of approximately 50 mm (2 inches). The protective covering shields both the control panel 60 and the actuator 16 from water, dirt, and the like that may be present in the irrigation environment.

Figure 5:
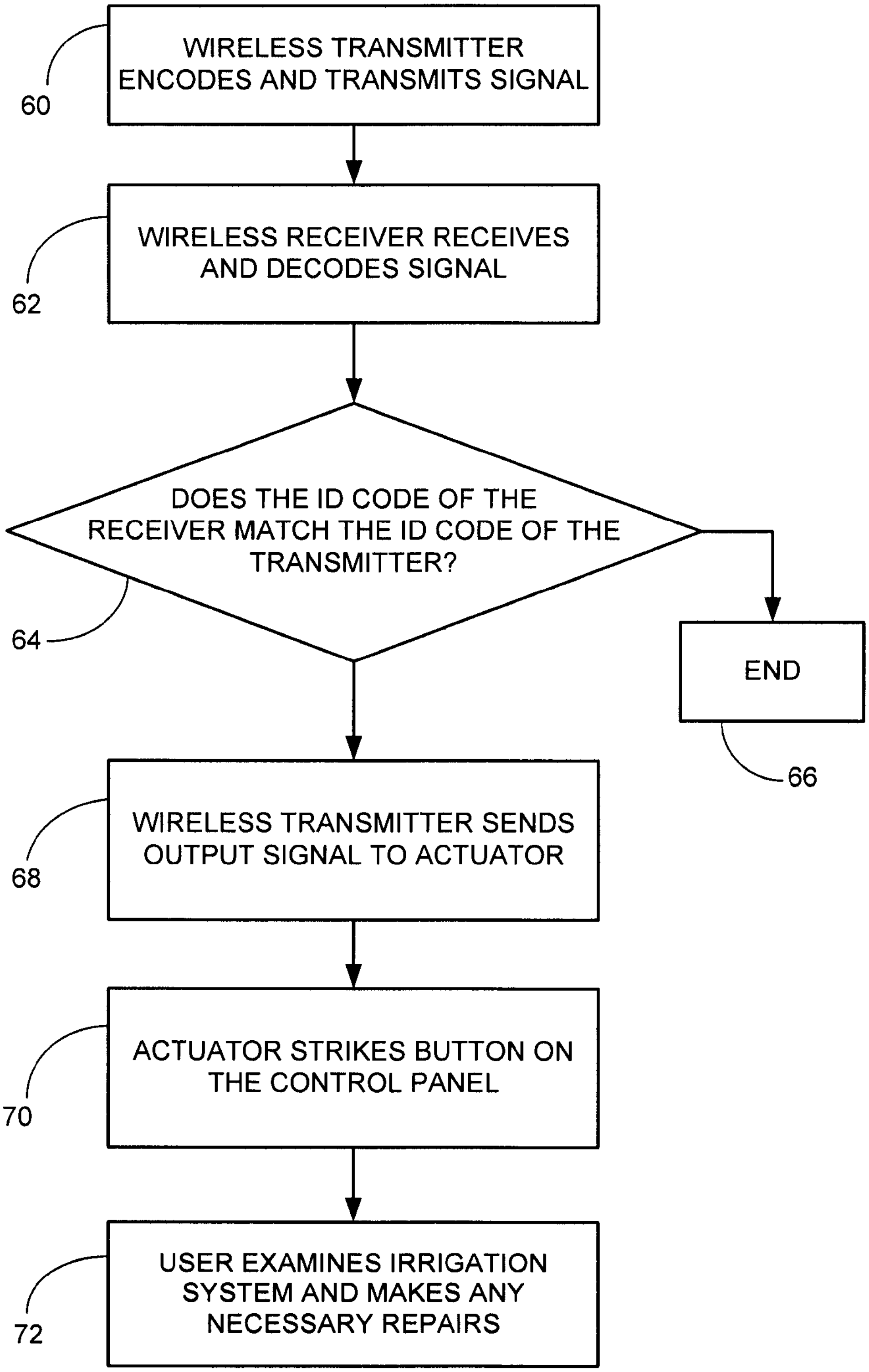
FIG. 5 is a flowchart illustrating an exemplary method of operation of the diagnostic tool of FIG. 1.

Referring now to FIG. 5, a method of operating the diagnostic tool 10 is described. In step 62, the wireless transmitter sends an encoded signal to the wireless receiver in response to a button press from a user. The signal is encoded using inputs from several dip switches, as well as an input from the button pressed by the user. The signal is preferably transmitted by radio frequency, and has a broadcast distance of about 1500-2000 feet. However, under ideal conditions, broadcast distances of up to two miles may be possible.

The receiver receives and decodes the transmitted signal in step 64. The transmitted signal is decoded using inputs from dip switches on the receiver which correspond to dip switches on the transmitter. In step 66 it is determined whether the ID code represented by the transmitter dip switches matches the ID code represented by the receiver dip switches. If the unique codes do not match, then processing is terminated in step 68. Otherwise, in step 70, the decoder outputs a signal to the output port of the receiver. The output signal is provided to a transistor closing a relay switch, and energizing the solenoid of the actuator.

In step 72, when the solenoid is energized, a magnetic field is formed. The magnetic field formed by the solenoid causes the plunger to move, striking a start/stop button on the control panel of a central pivot, causing the irrigation system to begin operation. Finally, in step 74, the user examines the problem area of the center pivot irrigation system to determine what problem has occurred and how best to correct the malfunction. Once the diagnosis is made, the user may again press the button of the wireless transmitter, causing the irrigation system to halt operations so that necessary repairs may be made.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A diagnostic tool for an agricultural field irrigation system, the irrigation system having a control panel including at least push buttons for controlling the operation of the system, said diagnostic tool comprising:

a wireless transmitter, said wireless transmitter being configured to selectively encode and transmit an encoded signal;

a wireless receiver configured to receive said encoded signal, decode said signal and provide an output signal; and a solenoid and a ferromagnetic plunger operatively connected to said wireless receiver and being configured to be removably secured to the control panel using one or more magnets, wherein said wireless receiver provides said output signal to said solenoid and said ferromagnetic plunger upon receipt of said encoded signal, and wherein said solenoid is configured to cause said ferromagnetic plunger to activate the irrigation system by physically pushing at least one of the push buttons in response to said output signal, said ferromagnetic plunger having a predetermined throw distance.

2. The diagnostic tool of claim 1, wherein said wireless transmitter comprises a radio frequency transmitter.

3. The diagnostic tool of claim 1, wherein said solenoid and said ferromagnetic plunger are mounted to the control panel using 4-6 magnets spaced apart around said solenoid.

4. The diagnostic tool of claim 1, wherein said predetermined throw distance is in the range of approximately 3-5 mm.

5. The diagnostic tool of claim 1, wherein said predetermined throw distance is in the range of approximately 0.5-1 mm.

6. The diagnostic tool of claim 1, further comprising a waterproof control box housing at least said wireless receiver.

* * * * *